US008380053B2

(12) United States Patent
Tran et al.

(10) Patent No.: US 8,380,053 B2
(45) Date of Patent: Feb. 19, 2013

(54) SYSTEM AND METHOD FOR PROCESSING VIDEO

(75) Inventors: Thanh T. Tran, Houston, TX (US); Todd C. Hiers, Houston, TX (US); Ivan Garcia, Richmond, TX (US); Jian Wang, Stafford, TX (US)

(73) Assignee: Texas Instruments Incorporated, Dallas, TX (US)

( * ) Notice: Subject to any disclaimer, the term of this patent is extended or adjusted under 35 U.S.C. 154(b) by 905 days.

(21) Appl. No.: 12/330,338

(22) Filed: Dec. 8, 2008

(65) Prior Publication Data
US 2010/0142931 A1 Jun. 10, 2010

(51) Int. Cl.
*H04N 5/917* (2006.01)
(52) U.S. Cl. ........................ 386/329; 386/331
(58) Field of Classification Search .......... 386/326–331, 386/353–356
See application file for complete search history.

(56) References Cited

U.S. PATENT DOCUMENTS 6,904,094 B1 * 6/2005 Liu et al. .................. 375/240.13
2004/0105653 A1 * 6/2004 Horiuchi et al. ................ 386/46

* cited by examiner

*Primary Examiner* — Thai Tran
*Assistant Examiner* — Nigar Chowdhury
(74) *Attorney, Agent, or Firm* — W. James Brady; Frederick J. Telecky, Jr.

(57) ABSTRACT

A system and method for allocating video processing tasks over multiple video processors include an apparatus. The apparatus includes a plurality of video processors. Each video processor includes a first processor that processes video data and manages buffers used in conversion and displaying video data. The video processor includes a second processor that performs video data signal processing and manages buffers used in processing video data. The apparatus also includes a switch coupled to each video processor, as well as video inputs and video outputs. A third processor coupled to the switch, and a memory coupled to each video processor and to the third processor, are also part of the apparatus. The switch selectively couples a video processor to a video input or a video output, the third processor configures the switch based on processing requirements of each video stream, and the memory buffers and stores video data.

15 Claims, 5 Drawing Sheets

SYSTEM AND METHOD FOR PROCESSING VIDEO

TECHNICAL FIELD

The present invention relates generally to a system and method for video processing, and more particularly to a system and method for allocating video processing tasks over multiple video processors.

BACKGROUND

Video has become an important component in both the entertainment industry and business. Movies, television programs, Internet video, video games, and the like, have become the dominant way for users seeking information and/or diversion, while videos, commercials, and so forth, have become significant avenues for businesses to market themselves and their products. Additionally, traditional broadcast media (such as television) has given way to the Internet and other communications network, as well as personal media (such as video discs, memory cards, and so forth) as video distribution methods.

However, video may require a considerable amount of storage space to store and network bandwidth to transmit if left in an uncompressed state. This is especially true with high resolution video, such as various forms of high-definition video. Compressing the video trades image quality for a reduction in storage space and network bandwidth requirements. However, if a good video compression technique is used, such as H.264/AVC, for example, then the image quality does not need to be noticeably degraded to significantly reduce storage space and network bandwidth.

Unfortunately, compressing (encoding), uncompressing (decoding), and converting (transcoding) video may also require a large amount of processing power. A large number of solutions have been presented that provide a combination of video encoding, decoding, and/or transcoding solutions. However, these techniques have generally been fixed solutions, meaning that they are designed to perform a particular combination of video encoding, decoding, and/or transcoding, and may not be capable of performing a different combination or multiple combinations of video encoding, decoding, and/or transcoding.

Furthermore, elaborate video buffering schemes have been developed since the commonly used two video buffer system, wherein the two video buffers are used in an alternating, ping-pong fashion, may not be adequate to provide sufficient video buffer data rates required for high resolution video. These elaborate video buffering schemes may be expensive both in terms of hardware and software requirements.

SUMMARY OF THE INVENTION

These and other problems are generally solved or circumvented, and technical advantages are generally achieved, by embodiments of a system and a method for allocating video processing tasks over multiple video processors.

In accordance with an embodiment, an apparatus for processing video data having a plurality of video inputs and a plurality of video outputs is provided. The apparatus includes a plurality of video processors with each video processor configured to process video data, a switch coupled to each video processor in the plurality of video processors, to the plurality of video inputs, and to the plurality of video outputs, a third processor coupled to the switch, and a memory coupled to the plurality of video processors, and to the third processor. Each video processor includes a first processor that processes video data and manages buffers used in conversion and displaying video data, and a second processor that performs video data signal processing and manages buffers used in processing video data. The switch selectively couples a video processor to one or more video inputs or one or more video outputs, the third processor specifies a configuration of the switch based on processing requirements of each video stream at the plurality of video input, and the memory buffers and stores video data.

In accordance with another embodiment, a method for allocating video processing tasks is provided. The method includes receiving an incoming video stream, computing video processing requirements based on the incoming video stream, and assigning video processing resources based on the video processing requirements and available video processing resources. The method also includes specifying a configuration for a switch based on the assigned video processing resources, wherein the configuration specifies a coupling of the incoming video stream to the assigned video processing resources.

In accordance with another embodiment, a method for buffer management is provided. The method includes receiving a new video frame, selecting a new video buffer from a pool of available video buffers, and storing the new video frame in the selected new video buffer. The method also includes assigning the selected new video buffer for processing to a video processing resource selected based on processing requirements of the new video frame and available video processing resources, and video processing the selected new video buffer.

An advantage of an embodiment is that multiple combinations of video encoding, decoding, and/or transcoding are possible, with the combinations being based on video processing needs.

A further advantage of an embodiment is that a processor used to control the video encoding, decoding, and/or transcoding, may also be used to perform video processing operations, such as filtering, and so forth.

Yet another advantage of an embodiment is that the buffer management techniques help to ensure that video buffers are capable of meeting data rates required for processing high resolution video.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a video processing system capable of flexibly encoding, decoding, and/or transcoding high-definition video. The video processing system has multiple video processors, a switch, and a processor controlling the multiple video processors and assigning the video processor to encoding, decoding, and/or transcoding tasks based on desired video processing. The invention may also be applied, however, to other video processing systems, including standard definition video systems, enhanced resolution video systems, and combinations thereof.

Figure 1A:
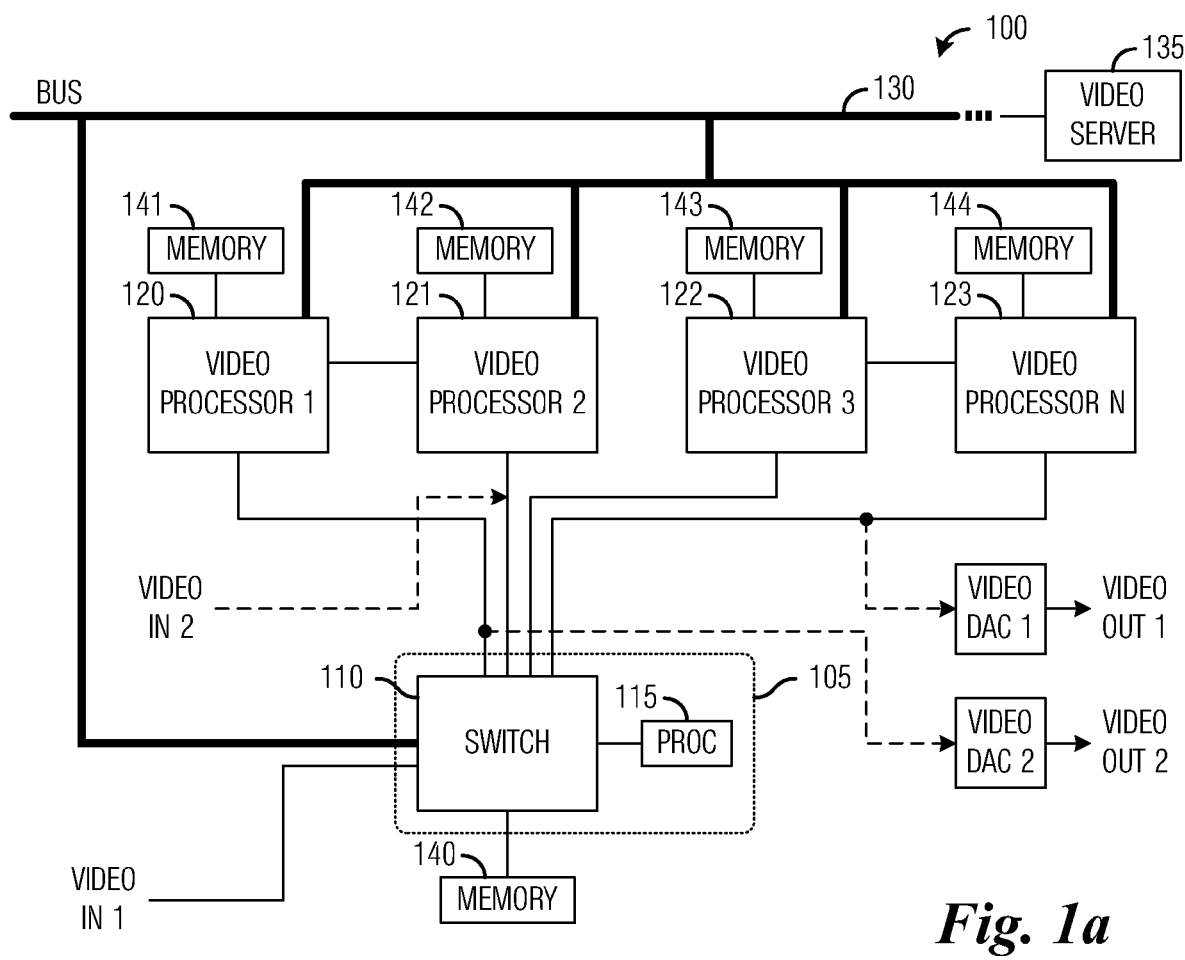
FIG. 1a is a diagram of a video processing system.

FIG. 1a shows a diagram that illustrates a video processing system 100. Video processing system 100 may be used to process (encode, decode, transcode, and so forth) video, such as high-definition video. Although the discussion focuses on high resolution, high-definition video, the embodiments may be applicable to video of any resolution or form. Therefore, the discussion of processing high resolution, high-definition video should not be construed as being limiting to either the scope or the spirit of the embodiments.

Video processing system 100 may be capable of automatically determining video processing needs of incoming video streams and assign video processors to handle the processing needs. If processing an incoming video stream requires more video processing capability than a single video processor is capable of providing, for example, with very high resolution high-definition video, then video processing system 100 may be capable of slicing the video into multiple slides and assigning different video processors to each slice. As long as adequate video processing capability is available, video processing system 100 may be capable of performing simultaneous processing of multiple video streams. Additionally, video processing system 100 may also be capable of simultaneously displaying multiple output video streams.

Video processing system 100 includes a digital media controller 105. Digital media controller 105 may be used to control the flow of video streams throughout video processing system 100. Furthermore, digital media controller 105 may be used to assign video processing tasks, such as, video encoding, video decoding, and/or video transcoding, for example, to one or more of a plurality of video processors.

Digital media controller 105 includes a switch 110 that may be used to couple video inputs, video outputs, memories, digital-to-analog converters (DACs), analog-to-digital converters (ADCs), and so forth, to the plurality of video processors. According to an embodiment, switch 110 may be implemented as a crossbar switch, which may enable connectivity between substantially every component (for example, every video input may be coupled to every video output) in video processing system 100. However, to simplify switch design, switch 110 may be implemented as a partial crossbar switch that may enable connectivity between selected components in video processing system 100. For example, certain video inputs may be coupled to only certain video processors, while some video processors may be coupled to each video output, some video processors may only be coupled to a single video output, and so on.

Digital media controller 105 also includes a processor 115. Processor 115 may be used to detect and assign video processing tasks to the video processors in the plurality of video processors. For example, depending on processing requirements of an incoming video stream as well as available video processors, input/output requirements, and so forth, processor 115 may assign one or more video processors to process the incoming video stream. According to an embodiment, a general purpose microprocessor or a controller may be used to implement processor 115.

As shown in FIG. 1a, video processing system 100 includes a plurality of video processors, such as video processor 1 120, video processor 2 121, video processor 3 122, and video processor N 123. The plurality of video processors may be coupled to each other and to digital media controller 105 by a bus 130, such as a peripheral component interconnect (PCI) bus, or any of a variety of high-speed data interconnection busses, such as universal serial bus, IEEE 1394, and so forth. Bus 130 may also be used to allow a data connection to be established between video processing system 100 and sources of video. For example, bus 130 may allow for video processing system 100 to be connected to a video server 135 or some other video source located on the Internet, a proprietary or public wired or wireless data network, terrestrial communications system, public switched telephone network, and so on.

Figure 1B:
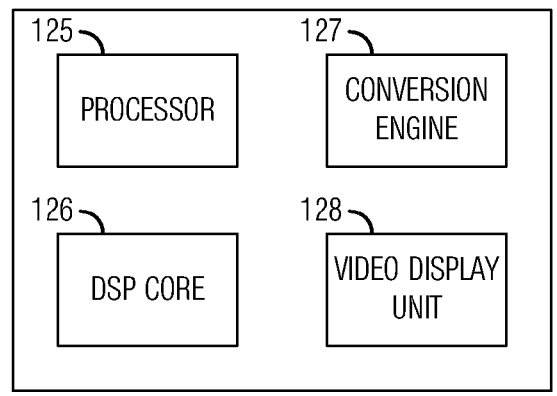
FIG. 1b is a diagram of a detailed view of a video processor.

FIG. 1b is a diagram illustrating a view of a video processor. FIG. 1b illustrates a detailed view of a video processor, such as video processor 120. Although video processor 120 is shown, detailed views of video processors 121-123 may be substantially similar. Video processor 120 includes a processor 125, a digital signal processor (DSP) core 126, a conversion engine 127, and a video display unit 128. Video processor 120 may include other components, such as busses, controllers, memory controllers, and so forth, which are not shown in FIG. 1b to maintain simplicity.

Processor 125 may be used to perform tasks such as video decoding, transcoding, encoding, and so forth. Furthermore, processor 125 may be used to manage peripherals, processing tasks, as well as provide synchronization between devices in video processor 120. Additionally, processor 125 may be used to manage usage of video buffers used in chrominance conversion and display buffers used in displaying video frames. Processor 125 may be implemented using any of a variety of general purpose processors, central processing units, and so forth. DSP core 126 may be used to perform tasks such as providing signal processing operations on the video streams. Examples of signal processing may include filtering, compression, decompression, and so forth. Additionally, DSP core 126 may be used to manage usage of video buffers used in decoding, transcoding, encoding, and so forth, of video frames. DSP core 126 may be implemented using any of a variety of DSP cores.

Conversion engine 127 may be a hardware and/or software unit in video processor 120 that may be used to perform conversion on the video frames of the video stream, such as chrominance conversion, for example. Video display unit 128 may be a hardware and/or software unit in video processor 120 that may be used to control the displaying (or outputting) of video frames of the video stream. Video display unit 128 may control the displaying of video frames stored in display buffers to help prevent or reduce the dropping or skipping of video frames while maintaining a proper frame rate.

Referring back now to FIG. 1a, video processors in the plurality of video processors and digital media controller 105 may also be coupled to memories, such as memory 140, memory 141, memory 142, memory 143, and memory 144. The memories may be used to store programs, applications, data, and so forth. The memories may also be used as video buffers for storing video data as it is received or processed and/or display buffers for video frames ready for display or output purposes. Although shown as separate entities, the memories may be implemented as a single global memory shared by the plurality of video processors and digital media controller 105. For example, the memories shown in FIG. 1a may be implemented as a single memory coupled to the plurality of video processors and digital media controller 105 via bus 130. According to an embodiment, the memory may be implemented as a high data rate memory (such as a double data rate (DDR2) memory) having a 32-bit port to enable fast reading from and writing to the memory.

Video processing system 100 also includes several video inputs to allow for a direct connection of video sources to video processing system 100, such as video cameras, video playback devices, multimedia devices, and so forth. Furthermore, video processing system 100 also includes several video outputs to allow for a direct connection of video devices to video processing system 100, such as video display devices, video storage devices, network connected devices, and so on. Depending on video input and video output type, DACs, ADCs, HDMI receivers, HDMI transmitters, as well as special dedicated components required to provide functions such as signal format conversion, and so forth, may be needed to perform necessary conversion between analog and digital data.

In addition to be connected via bus 130, some of the video processors in the plurality of video processors may be directly connected to one another by a high-speed connection. For example, video processor 1 120 may be connected to video processor 2 121, while video processor 3 122 may be connected to video processor N 123. The direct connections may enable a high-speed connection without interference from communications that may be taking place on bus 130, which may create a potential communications bottleneck.

Figure 2:
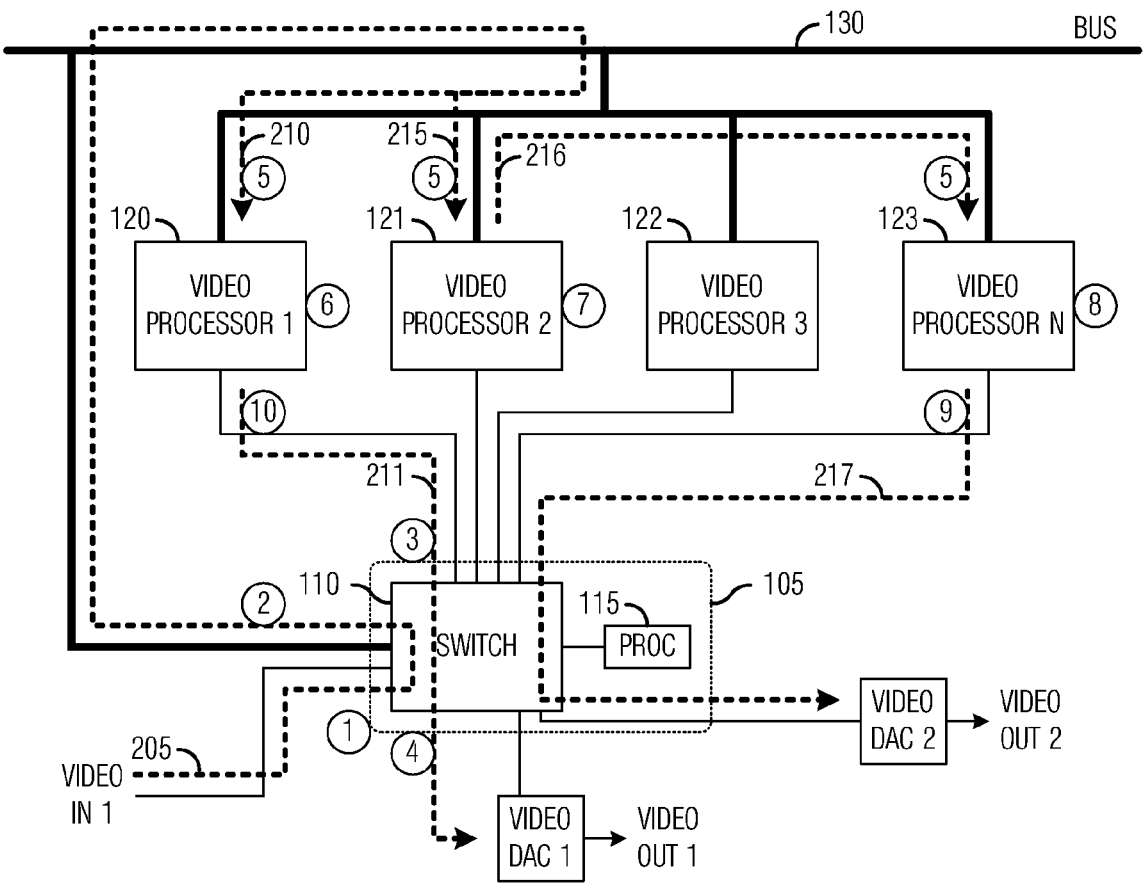
FIG. 2 is a diagram of a video processing system displaying exemplary video processing.

FIG. 2 is a diagram illustrating exemplary video processing by video processing system 100. FIG. 2 displays video processing system 100 simultaneously processing and displaying two incoming video streams. As shown in FIG. 2, both incoming video streams may arrive at video processing system 100 via video in 1. The two incoming video streams, shown as dashed line 205, may pass through digital media controller 105 (switch 110) where they may be automatically detected and assigned to video processors in the plurality of video processors. For example, digital media controller 105 (processor 115) may assign a first incoming video stream to video processor 1 120 (shown as dashed line 210) and a second incoming video stream to video processor 2 121 (shown as dashed line 215). After assignment, the two incoming video streams may be directed to their assigned video processors.

For discussion purposes, let the first incoming video stream and the second incoming video stream both be MPEG-2 compressed data streams, with an intended use of the first incoming video stream being a decoding and displaying of the MPEG-2 data stream and an intended use of the second incoming video stream being a transcoding of the MPEG-2 data stream into an H.264 data stream and then a decoding and displaying of the H.264 data stream.

The first incoming data stream, as it arrives at video processor 1 120, may be decoded by video processor 1 120, producing a decoded data stream. The decoded data stream may then be returned back to digital media controller 105 (shown as dashed line 211) where it may be routed to a video output, such as video out 1. The second incoming data stream, as it arrives at video processor 2 121, may be transcoded by video processor 2 121 into an H.264 data stream. The H.264 data stream, as produced by video processor 2 121 may be provided to another video processor, such as video processor N 123, where it may be decoded to produce a decoded data stream. Since the video processors in the plurality of video processors may be coupled by bus 130, the H.264 data stream may be directly transferred to video processor N 123 (shown as dashed line 216) instead of being forwarded through digital media controller 105. Video processor N 123 may then provide the decoded data stream back to digital media controller 105 (shown as dashed line 217) where it may be routed to a video output, such as video out 2.

Also shown in FIG. 2 are numerals indicating software components of video processing system 100. As shown in FIG. 2, a circle with numeral one (1) represents an Ethernet streamer client software component, a circle with a numeral two (2) represents a PCI stream sender software component, and a circle with a numeral three (3) represents a high-definition video digital loopback software component. Similarly, a circle with a numeral four (4) represents a high-definition video display software component, a circle with a numeral five (5) represents a PCI stream receiver software component, a circle with a numeral six (6) represents an MPEG-2 decoder software component, and a circle with a numeral seven (7) represents a high-definition video transcoder software component. Furthermore, a circle with a numeral eight (8) represents an H.264 decoder, and a circle with a numeral nine (9) represents a video display via DAC software component. Video processing system 100 may include other software not shown in FIG. 2, including a digital video output software component, a system boot software component, a system synchronization software component, and a demonstration state software component, amongst other software components.

Figure 3:
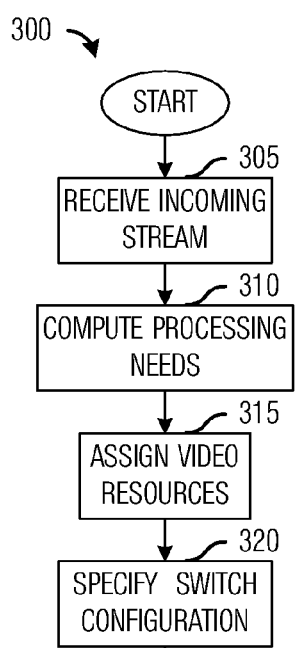
FIG. 3 is a flow diagram of events occurring in a digital media controller.

FIG. 3 is a flow diagram of events 300 occurring in digital media controller 105. The flow diagram may be descriptive of events occurring in digital media controller 105 as it detects an incoming video stream and makes an assignment of video processor(s) based on processing requirements of the incoming video stream. In addition to basing the assignment on the processing requirements of the incoming video stream, digital media controller 105 may also take into consideration available video processing resources. For example, if the incoming video stream requires more video processing resources than what is available, then digital media controller 105 may need to reject the processing of the incoming video stream, delay the processing of the incoming video stream, preempt the processing of another video stream, or so on.

Events 300 may begin with digital media controller 105 receiving an incoming video stream (block 305). After receiving the incoming video stream, digital media controller 105 may compute processing needs of the incoming video stream (block 310). Digital media controller 105 may take into consideration the incoming video stream's type, any existing encoding of the incoming video stream, available video processing resources, any specified processing, desired output format, and so forth, in determining processing needs. After making the computation of processing needs, digital media controller 105 may make an assignment of video processing resources (block 315). Digital media controller 105 may make an assignment that includes video processors, video buffers, video outputs, DACs, and so forth. The assignment of video processing resources may then be used to specify a configuration of switch 110, which would allow for the incoming video stream to reach the assigned video processing resources as well as an outgoing video stream (produced by the assigned video processing resources) to reach a video output capable of supporting a desired output video format (block 320). After specifying the configuration of switch 110, events 300 may terminate until another incoming video stream is detected.

Figure 4A:
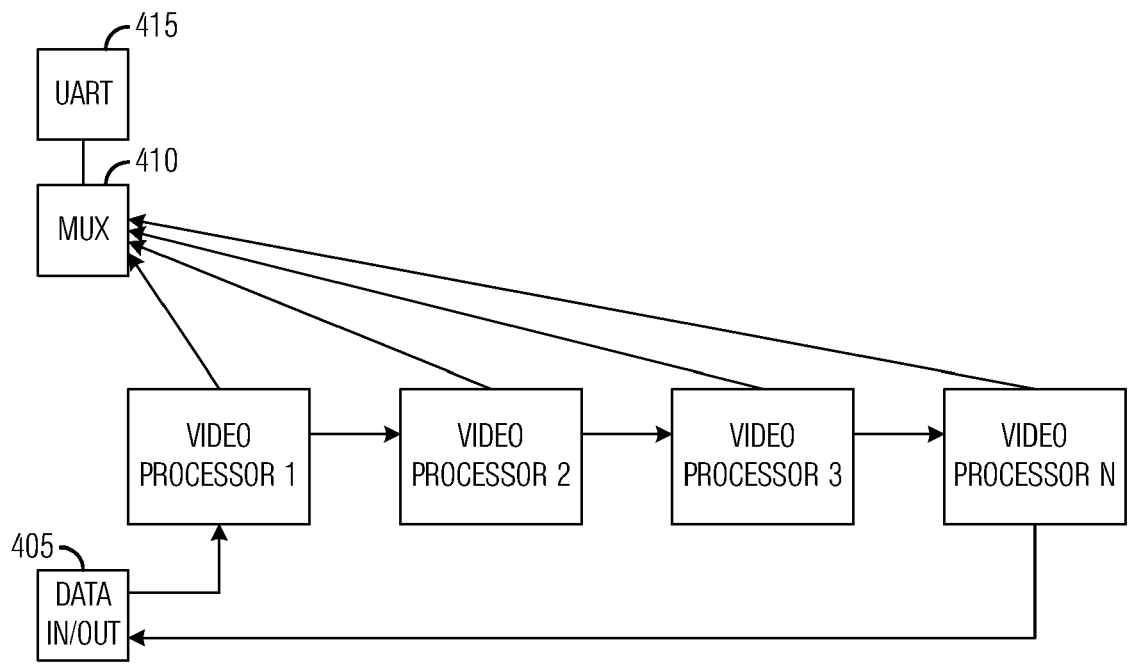
FIG. 4a is a diagram of a test and debug configuration of video processing system displaying a plurality of video processors.

FIG. 4a is a diagram illustrating a test and debug configuration of video processing system 100. The test and debug configuration of video processing system 100 shown in FIG. 4a may be used to test and debug the plurality of video processors. A data in/out port 405 may be used to scan in and out data, test/debug commands, control information, and so forth, to the plurality of video processors, which when operating in test/debug mode may be configured as a sequential chain of video processors. Data in/out port 405 may be used to scan in information necessary for testing/debugging the plurality of video processors. The information may be scanned in/out either in serially or in parallel or a combination of the two.

Each of the video processors may be coupled to a multiplexer 410 that may be used to enable information from the video processors to be monitored by way of a universal asynchronous receiver transmitter (UART) 415. UART 415 may allow for a display terminal to be connected to video processing system 100 and for a user to view progress in the plurality of video processors. Multiplexer 410 may allow for a single video processor to be monitored at any given time. However, through rapid switching of multiplexer 410, multiple video processors may be monitored simultaneously.

If the video frame is too large for a single video buffer or if the video stream is a high-definition video stream that may require multiple video processors to process the video stream in real-time, then DSP core 126 may partition the video frame into multiple slices and store the video frame slices into multiple video buffers. Again, depending on video processing resource assignments, DSP core 126 may indicate the video processors responsible for processing the video buffers.

Alternatively, if the video frame is too large, then processor 115 of digital media controller 105 may assign different slices of the video frame to different video processor, with each slide of the video frame being about equal to or less than the size of a video buffer. Then switch 110 may be configured to direct the slices of the video frame to the assigned video processors.

Figure 4B:
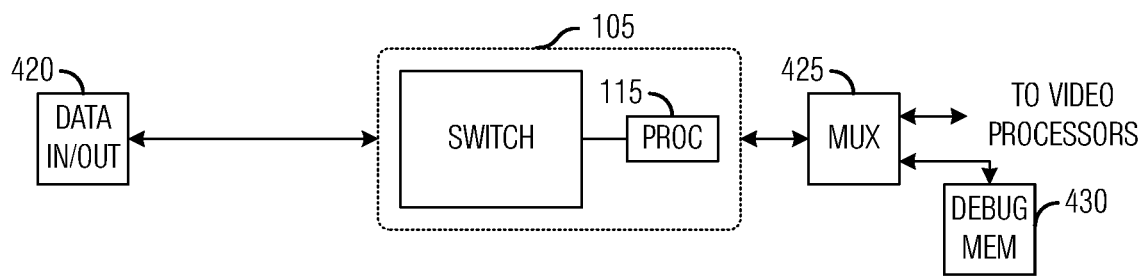
FIG. 4b is a diagram of a test and debug configuration of video processing system displaying a digital media controller.

FIG. 4b is a diagram illustrating a test and debug configuration of video processing system 100. The test and debug configuration of video processing system 100 shown in FIG. 4b may be used to test and debug digital media controller 105. A data in/out port 420, which may be the same as data in/out port 405 (FIG. 4a) may allow for information, such as data, test/debug commands, control information, and so forth, to be scanned in and out of digital media controller 105. The test and debug configuration of video processing system 100 may also include a multiplexer 425 to allow a coupling of digital media controller 105 to the plurality of video processors or debug memory 430. Debug memory 430 may contain special test/debug programs, applications, data, and so forth, to help facilitate testing/debugging digital media controller 105 as well as video processing system 100.

In general, video buffer management may be required to help ensure that video encoding/decoding/transcoding occurs at a sufficient rate so that video frames are not dropped as the video is being displayed. Furthermore, video buffer management may be helpful in minimizing video buffer size as well as reducing video buffer data transfer rates. This may help to reduce overall video processing system cost by minimizing memory requirements, as well as potentially enabling the use of slower, cheaper memory.

Figure 5:
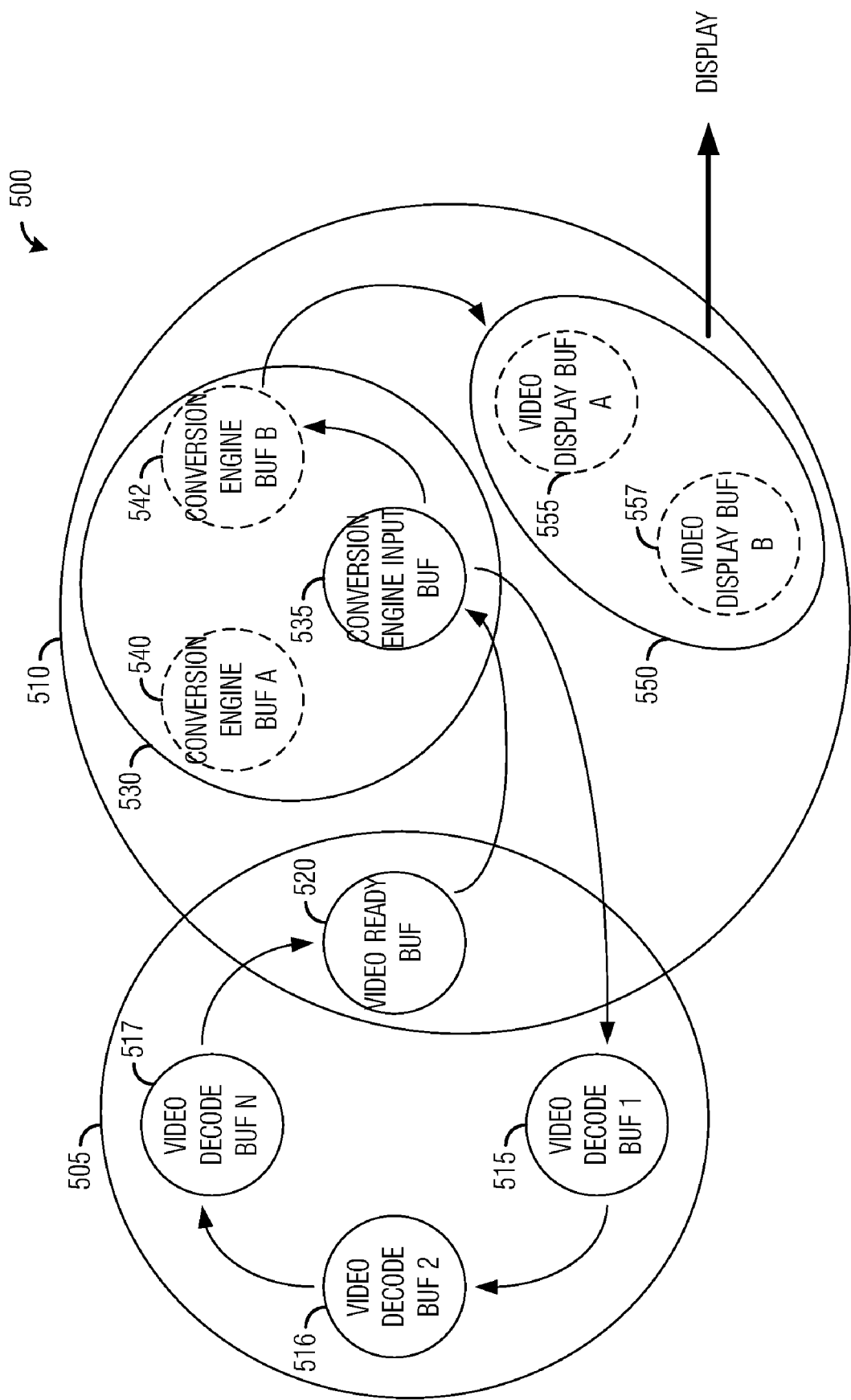
FIG. 5 is a state diagram of video buffer management in video processing system.

FIG. 5 is a transition diagram 500 illustrating video buffer management in video processing system 100. Transition diagram 500 shows video buffer management occurring in a video processor, such as video processor 120. The video buffer management, as shown in FIG. 5, may be in continuous operation while video processing system 100 is receiving an incoming video stream(s), processing received video stream(s), displaying processed video streams, and so forth. The video buffer management may operate continuously until there is no more video streams to process or display or until video processing system 100 is power down, reset, or so on.

Transition diagram 500 includes video buffer and display buffer management occurring in DSP core 126 of video processor 120 (shown as area 505) and processor 125 of video processor 120 (shown as area 510). In general, video buffers may be allocated in a common memory of video processing system 100 and centrally managed by DSP core 126 and processor 125 of each video processor. Transition diagram 500 may represent buffer (both video and display) management occurring in each video processor in video processing system 100. Although centrally located in a common memory, in general, video buffers used by a video processor are not accessed by other video processors.

Video processing may continue until no video buffers are available to store the video processing's output. A video buffer used to store a video frame (also referred to as an output buffer) may be selected from a pool of available video buffers. As shown in FIG. 5, three video buffers (video decode buffer 1 515, video decode buffer 2 516, and video decode buffer N 517) are currently assigned to store video frames for video processing (decoding) purposes.

When a video processor completes its processing of a video frame in a video buffer, DSP core 126 may detect the completion and set a video buffer ready flag to indicate that the processing of the video frame in the video buffer is complete. As shown in FIG. 5, a video ready buffer 520 may represent a video buffer that has completed processing and is ready for subsequent processing. When a video buffer has completed processing and is in the ready state (with the video buffer ready flag set), the video buffer may be in a state wherein it may be managed by both DSP core 126 and processor 125. After DSP core 126 has set the video buffer ready flag, processor 125 may take over management of video buffer.

When processor 125 detects that a video buffer has completed processing (its video buffer ready flag is set), processor 125 may check to determine if there is a display buffer available from a pool of available display buffers. If there is an available display buffer, processor 125 selects a display buffer and initiates a conversion of the video buffer into the display buffer. Part of the conversion process may involve a conversion of the contents of the video buffer, for example, chrominance conversion. As the conversion takes place, the contents of the video buffer is read from the video buffer, gets converted, and written into the display buffer. The conversion takes place in a conversion engine (shown as circle 530) and a pointer to the video buffer is provided to a conversion engine input buffer 535. As the conversion progresses, the converted contents of the video buffer is written into either conversion engine buffer A 540 or conversion engine buffer B 542.

After conversion, a converted conversion engine output buffer is produced. The converted conversion engine output buffer is ready for display and may be inserted into a display buffer pool. Processor 125 may insert the converted conversion engine output buffer into the display buffer pool by setting a display flag and providing a pointer to the converted conversion engine output buffer to the display buffer pool.

Display buffers in the display buffer pool may be used by a video display unit (shown as oval 550) in the displaying of video frames. When a video display buffer, such as video display buffer A 555 or video display buffer B 557, is available, a display buffer from the display buffer pool may be selected and a pointer to the selected display buffer may be provided to either video display buffer A 555 or video display buffer B 557 (which ever is available for use). The contents of the video display buffer may then be displayed or otherwise output. Once completed, the display buffer may be returned to the pool of available display buffers for reuse.

Figure 6A:
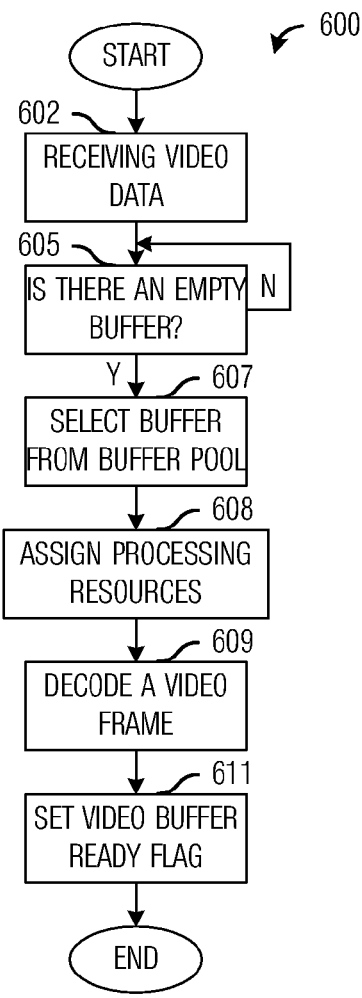
FIG. 6a is a flow diagram of the management of video buffers used to control decoding of incoming video streams.

FIG. 6a is a flow diagram illustrating the management of video buffers for video processing (for example, encoding, decoding, transcoding, and so forth) 600. Management of video buffers used to buffer incoming video streams 600 may be operation while video processing system 100 is in normal operations and is receiving at least one incoming video stream. As discussed previously, video buffers used to buffer incoming video streams may be managed by DSP core 126 of a video processor.

Management of video buffers used to buffer incoming video streams 600 may begin with receiving video data (block 602). DSP core 126 may then check to determine if there is a video buffer available for use in a pool of available video buffers (block 605). If there is a video buffer available for use, then DSP core 126 may select a video buffer from the pool of available video buffers (block 607). The selection of the video buffer may be performed randomly or a video buffer with a lowest (or highest) index may be selected or some other process for selecting a video buffer may be utilized. If there are no video buffers available, DSP core 126 may be forced to wait until one does become available (by returning to block 605) or otherwise halt processing of the incoming video stream.

With a video buffer selected, an assignment of video processing resources of the video processor based on the requirements of the video frame may be made (block 608). The assignment of video processing resources may be based on the requirements of the video frame, the available video processing resources, priorities of existing and future assignments of video processing resources, and so forth. After the assignment of the video processing resources, the processing (decoding, transcoding, encoding, and so forth) of an incoming video frame may start and proceed to completion (block 609). Once the decoding of the incoming video frame is complete, DSP core 126 may mark that the processing of the incoming video frame in the video buffer as completed by setting a video buffer ready flag associated with the video buffer and moved into a video buffer ready pool (block 611).

Figure 6B:
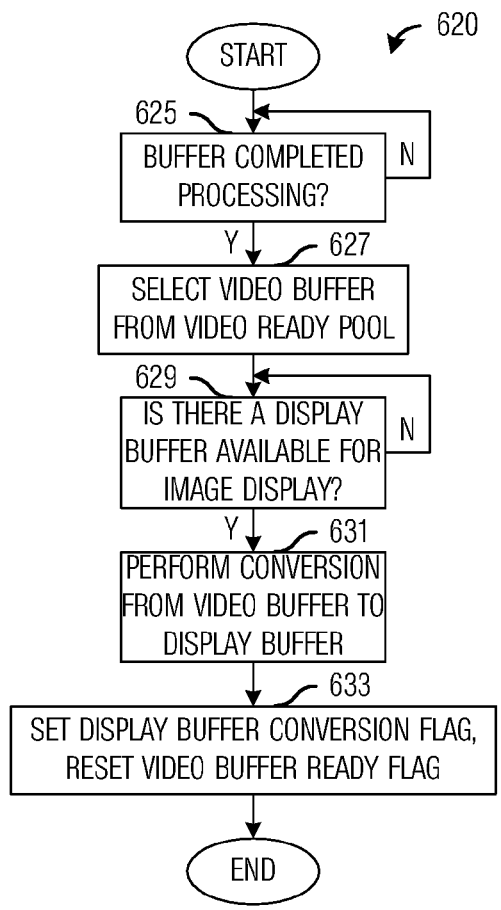
FIG. 6b is a flow diagram of the management of video buffers used for post processing conversion.

FIG. 6b is a flow diagram illustrating the management of video buffers used to buffer video streams for post processing conversion 620. Management of video buffers used to buffer video streams for post processing conversion 620 may be operation while video processing system 100 is in normal operations and is receiving at least one incoming video stream. As discussed previously, video buffers used to buffer video frames for post processing conversion may be managed by processor 125 of a video processor.

Management of video buffers used to buffer video streams for post processing conversion 620 may begin with processor 125 checking to determine if a video buffer has completed processing (block 625). A video buffer that has completed processing may have its video buffer ready flag set by DSP core 126 and then placed in video buffer ready pool. If there is at least one video buffer in the video buffer ready pool, then processor 125 may select a video buffer from the video buffer ready pool (block 627). If there are more than one video buffer in the video buffer ready pool, processor 125 may select a video buffer by video frame number, video frame age, video frame priority, or some other selection methodology. If there are no video buffers in the video buffer ready pool, processor 125 may wait until one becomes available.

After selecting a video buffer from the video buffer ready pool, processor 125 may check to determine if there is a display buffer available for image display (block 631). Available display buffers may be stored in a pool of available display buffers, for example. If a display buffer(s) is available, processor 125 may select a display buffer from the pool of available display buffers. If there are no available display buffers in the pool of available display buffers, processor 125 may wait until one becomes available.

Once a display buffer becomes available, processor 125 may select it and initiate a conversion of the video buffer into a display buffer (block 631). Conversion of the video buffer into the display buffer may include performing a chrominance conversion of the video frame in the video buffer. Part of the conversion may also involve storing the converted contents of the video buffer into the display buffer. For example, part of the conversion may include a conversion from 4:2:0 video data into 4:2:2 video data, wherein 4:2:0 and 4:2:2 are different color space formats. After the conversion process completes, processor 125 may set the display buffer's conversion flag. Furthermore, after the conversion of the video buffer into the display buffer, the video buffer is no longer needed and may be released back into the pool of available video buffers. This may be accomplished by resetting the video buffer ready flag (block 633).

Figure 6C:
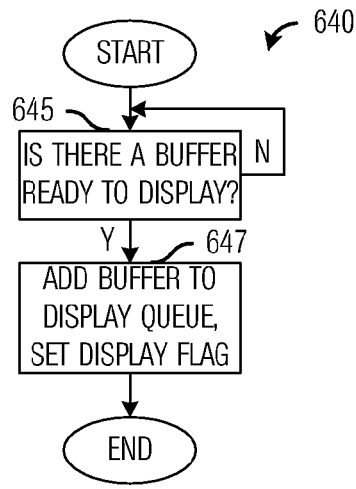
FIG. 6c is a flow diagram of the management of display buffers for display.

FIG. 6c is a flow diagram illustrating the management of display buffers in scheduling of display buffers 640. Management of video buffers in scheduling of display buffers 640 may be in operation while video processing system 100 is in normal operations and processing at least one video stream. As discussed previously, video buffers used in scheduling of display buffers may be managed by processor 125 of a video processor.

Management of display buffers in video stream display 640 may begin with processor 125 checking to determine if there is a display buffer ready for display (block 645). A display buffer with its conversion flag set may indicate that the display buffer has undergone and has completed conversion from a video buffer to a display buffer, including chrominance conversion. If there is a display buffer ready for display, then the display buffer may be added to a display queue (block 647). In addition to adding the display buffer to the display queue, processor 125 may set the display buffer's display flag.

Figure 6D:
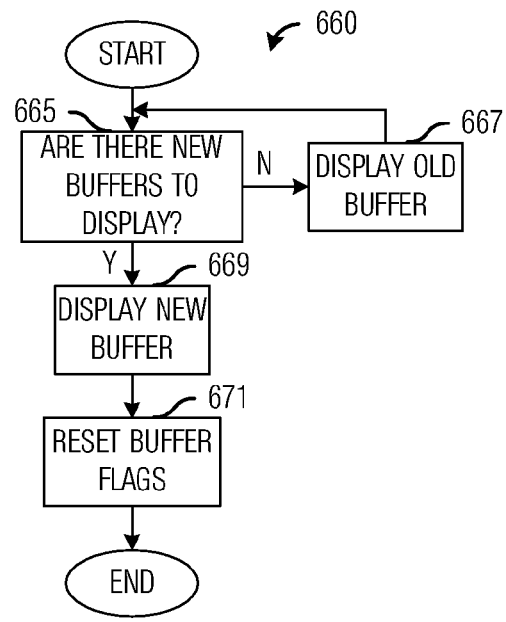
FIG. 6d is a flow diagram of the management of display buffers in displaying video streams.

FIG. 6d is a flow diagram illustrating the management of display buffers for display purposes 660. Management of display buffers for display purposes 660 may be in operation while video processing system 100 is in normal operations and processing at least one video stream. As discussed previously, display buffers used in displaying a video stream may be managed by processor 125 of a video processor.

Management of display buffers for display purposes 660 may begin with processor 125 checking to determine if there is a display buffer ready for display (block 665). A display buffer with its display flag set may be a display buffer containing a video frame (or a slice of a video frame) that has completed processing and conversion and may be ready for display. If there are no display buffers with display flag set, then processor 125 may have a video display unit display a video frame stored in an old output display buffer (block 667). This is may be achieved by leaving the contents of the old output display buffer unchanged. Processor 125 may then return to wait for a new display buffer to become ready.

If there is a display buffer ready for display, processor 125 may initiate the displaying (or outputting) of the contents of the display buffer (block 669). Processor 125 may pass a pointer to the display buffer to an output display buffer or processor 125 may copy the contents of the display buffer to an output display buffer, for example. After the display buffer has been displayed, the display buffer may be released back into the pool of available display buffers (block 671). This may be accomplished by resetting both the conversion flag and the display flag of the display buffer, for example.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus for processing video data having a plurality of video inputs and a plurality of video outputs, the apparatus comprising:
    a plurality of video processors, each video processor configured to process video data, each video processor comprising,
        a first processor configured to process video data and to manage buffers used in conversion and displaying video data, and
        a second processor configured to perform video data signal processing and to manage buffers used in processing video data;
    a switch coupled to each video processor in the plurality of video processors, to the plurality of video inputs, and to the plurality of video outputs, the switch configured to selectively couple a video processor to one or more video inputs or one or more video outputs;
    a third processor coupled to the switch, the third processor configured to specify a configuration of the switch based on processing requirements of each video stream at the plurality of video input; and
    a memory coupled to the plurality of video processors, and to the third processor, the memory to buffer and store video data.

2. The apparatus of claim 1, wherein the third processor is further configured to specify a type of processing of video data performed by a video processor.

3. The apparatus of claim 2, wherein the type of processing of the video data is based on the nature of the video data.

4. The apparatus of claim 1, wherein each video processor further comprises:
    a conversion engine configured to convert video data; and
    an image display unit configured to display converted video data.

5. The apparatus of claim 4, wherein the conversion engine is configured to perform chrominance conversion.

6. The apparatus of claim 1, wherein the first processor comprises a digital signal processor.

7. The apparatus of claim 1, wherein the memory comprises a high data-rate memory.

8. The apparatus of claim 7, wherein the memory comprises a double data rate memory.

9. The apparatus of claim 1, wherein the switch comprises a crossbar switch coupling each video input to each video processing resource and each video processing resource to each video output.

10. The apparatus of claim 1, wherein the switch comprises a partial crossbar switch, wherein the switch couples each video input to at least one of the video processing resources and each video processing resource to at lease one of the video outputs.

11. A method for allocating video processing tasks, the method comprising:
    receiving an incoming video stream;
    computing video processing requirements based on the incoming video stream;
    assigning video processing resources based on the video processing requirements and available video processing resources; and
    specifying a configuration for a switch based on the assigned video processing resources, wherein the configuration specifies a coupling of the incoming video stream to the assigned video processing resources, wherein the switch is coupled to a first, a second and a third processors and the first processor and second processor configured to process video data, manage buffers and process video data signals, and wherein the third processor configured to specify a configuration of the switch.

12. The method of claim 11, wherein computing the video processing requirements is based on the incoming video stream's type, existing encoding in the incoming video stream, specified video processing, and desired output format.

13. The method of claim 11, wherein the configuration further couples the assigned video processing resources to a video output.

14. The method of claim 13, wherein specifying the configuration of the switch comprises:
    specifying a first configuration for coupling a video input providing the incoming video stream to the assigned video processing resources; and
    specifying a second configuration for coupling the assigned video processing resources to the video output.

15. The method of claim 14, wherein the video output is capable of outputting an outgoing video stream produced by the assigned video processing resources from the incoming video stream.

* * * * *